Jan. 29, 1963
N. T. HEBERT ET AL     3,075,929
CONTINUOUS PROCESS FOR FOAMING A HALOMETHYLATED DIARYLOXIDE
Filed Aug. 4, 1960
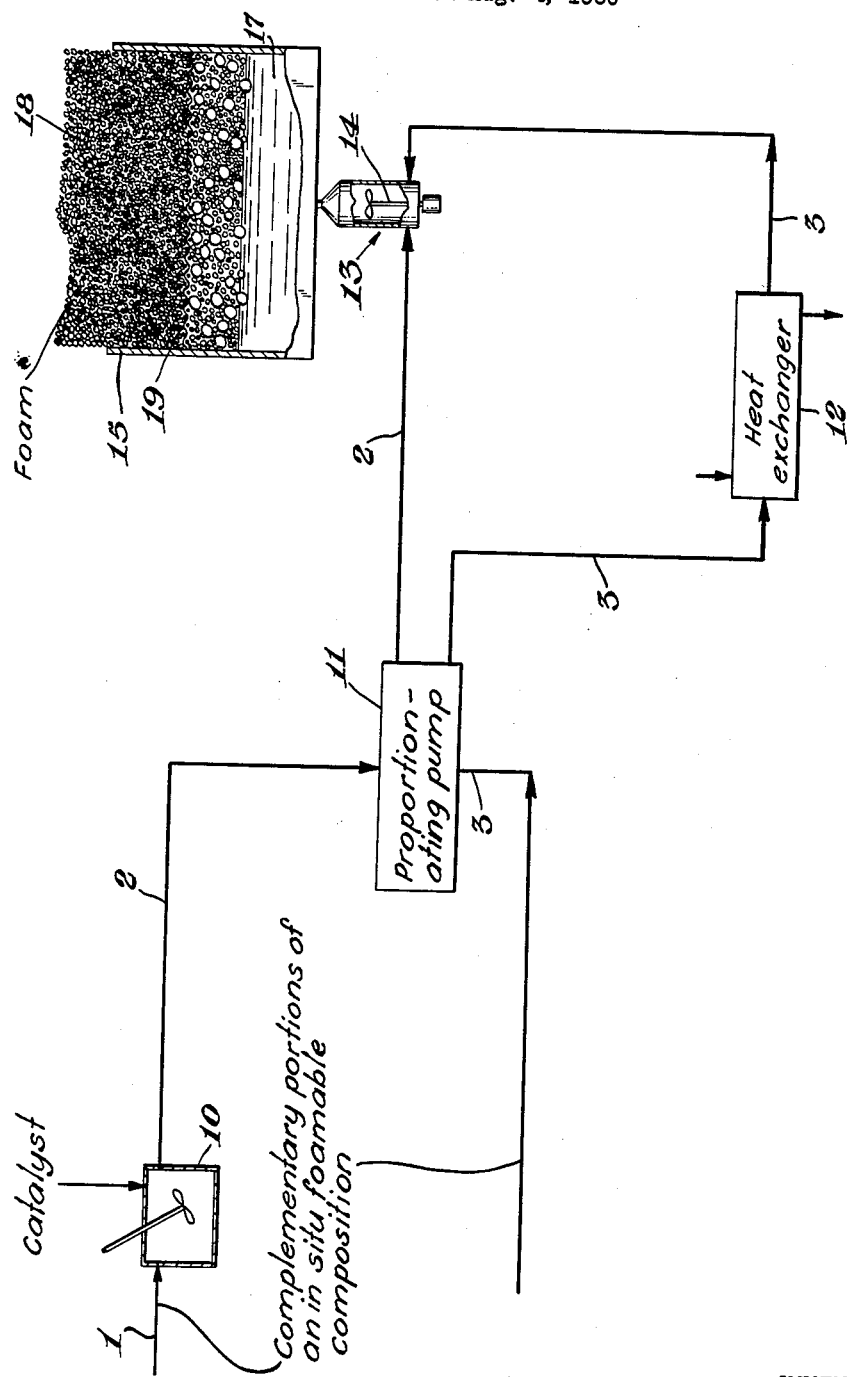
INVENTORS.
Norman T. Hebert
Earl H. Rosenbrock
James D. Doedens
BY *William L. Norris*
ATTORNEY

United States Patent Office 3,075,929
Patented Jan. 29, 1963

3,075,929
CONTINUOUS PROCESS FOR FOAMING A HALOMETHYLATED DIARYLOXIDE
Norman T. Hebert, Bay City, Earl H. Rosenbrock, Auburn, and James D. Doedens, Midland, Mich., assignors to The Dow Chemical Company, Midland, Mich., a corporation of Delaware
Filed Aug. 4, 1960, Ser. No. 47,428
6 Claims. (Cl. 260—2.5)

The present invention relates to a novel process for continuously foaming liquid, in situ, foamable compositions requiring the application of both a catalyst material and elevated temperatures to obtain the foamed product.

Continuous foaming processes that subject in situ foamable compositions to both heating and catalyzing steps, are difficult to control. Usually, premature foaming occurs while either or both of these steps are being completed. For example, homogeneous catalyst-reactant dispersions needed for uniform initiation of the foam-forming reaction can only be obtained by thoroughly mixing the catalyst material into the reactants. In such a process, the reactants being either preheated to a uniform temperature or heated simultaneously with the introduction of the catalyst, initiation of the foaming reaction will necessarily be non-uniform due to the time lag required to achieve a suitable dispersion of the catalyst. Similarly, if a uniform dispersion of the catalyst in the reactants is prepared first, the time period required to achieve uniform reaction temperatures permits uneven foaming.

A further problem of continuous foaming processes involves the plugging of equipment, especially when, in order to obtain a rapid heat transfer, it is necessary to locally apply heat to the catalyzed in situ foamable composition at relatively high temperatures. The present invention obviates these and other difficulties often encountered in continuous foaming of in situ foamable compositions.

It is a principal object of the present invention to provide a novel continuous process for foaming liquid, in situ foamable compositions. Another object is to provide a process for obtaining uniform foams from liquid, foamable compositions requiring the application of both heat and a catalyst material to initiate the foaming reaction. A further object is to provide a process for foaming compositions comprising a major proportion of halomethylated diaryloxides. Still further objects are to provide modified processes for improving the character and cure of such foams. Other objects will become apparent hereinafter as the invention is more fully described.

In accordance with the present invention, it has been discovered that the above objects are achieved in a process which comprises the steps of providing a plurality of feed streams of miscible complementary portions of at least one liquid composition that undergoes an in situ foaming reaction to provide a solid foam only at elevated temperatures and in the presence of a foam-initiating catalyst, at least one of said streams comprising a foam-initiating catalyst material and being at a temperature below that at which the foaming reaction occurs and at least one of said streams being substantially free of such a catalyst material and containing sufficient thermal energy to bring a mixture of said plurality of streams to a foaming-reaction temperature and causing said plurality of streams to be mixed with one another whereby a foamed product is produced. Preferably, this foaming mixture is conveyed into a suitable foaming container which may mold or otherwise shape the resulting solid foam as it cures.

As employed herein, the terminology "complementary portions" means that the contents of said feed streams will provide, when mixed together, a composition capable of undergoing an in situ foaming reaction, i.e., a foam-forming polymerization reaction that generates its own blowing agent, upon the application thereto of a suitable catalyst and heat. Such complementary portions may be provided as by supplying a single in situ foamable composition in two streams. The individual complementary portions may also consist in one or more instances of an in situ foamable composition containing special additives, e.g., additives to control foam density, pore size, cell structure, i.e., open or closed, strength, toughness, flexibility and the like characteristics. When such special additives are employed in a sufficient quantity and they are readily miscible with the basic monomer composition, they can be provided individually as a complementary portion of the in situ foamable composition. It should also be clearly understood that while a minimum of two streams is essential to the invention, more than two may be employed as may be desired to incorporate various reactants into the foamable composition.

The relative quantities of the complementary portions provided in each of said feed streams are not important but as a practical matter it is most desirable to provide relatively larger quantities in the feed stream or streams that contain the required thermal energy for the reaction since the temperature needed in these larger streams to bring the contents of all streams to the foaming reaction temperature is proportionately lower.

The specific catalyst and temperatures employed are dependent upon the particular needs of the in situ foamable composition that is being reacted in the above process and in its broader aspects, the process of the invention is not dependent upon their particular identity. The catalyst material can be incorporated into any feed stream into which it is conveniently dispersible.

Upon mixing the plurality of feed streams containing, in addition to the complementary portions of the in situ foamable composition, the required amounts of a catalyst material and thermal energy, the foaming reaction begins immediately. In view of this fact, it is desirable to keep the residence time of the reacting mixture within the mixing zone of the process equipment at a minimum. Usually, residence times no longer than about 5 seconds are sufficient to achieve a completely homogeneous mixture of the miscible complementary portions. The reaction mixture may then pass directly into a foaming container which is usually a vessel capable of retaining the liquid reaction mixture and molding or otherwise shaping the foam evolved therefrom until a satisfactory cure thereof is achieved.

Exceptional results are achieved in accordance with the objectives of the invention in a specific embodiment of the foregoing process which comprises the steps of providing a plurality of feed streams of miscible complementary portions of liquid, in situ foamable material comprising a major proportion of at least one halomethylated diaryloxide wherein the halogens are selected from the group consisting of chlorine and bromine, at least one of said streams comprising a foam-initiating catalyst material and being at a temperature below about that at which the foaming reaction occurs and at least one of said streams being substantially free of such a catalyst material and containing sufficient thermal energy to bring a mixture of said plurality of streams to a foaming-reaction temperature from about 40° to about 200° C., causing said plurality of streams to be mixed with one another whereby a solid foam is produced.

The halomethylated diaryloxides employed in the invention are to be construed as being inclusive of the chloro- and bromomethyl derivatives. They may be mono- or polyhalomethylated and they may be employed as individual compounds or as mixtures. While dinaphthyl oxides, bis(biphenyl)-oxides and the like symmetrical aromatic ethers and unsymmetrical aromatic ethers such as tolylphenyl oxide are operable, diphenyl oxide is preferred for the bis-aromatic ether nucleus. Halomethylated diphenyl oxides as prepared in accordance with current manufacturing techniques such as are disclosed in United States Letters Patent 2,911,380, are usually obtained as mixtures containing varying proportions of the mono-, di-, tri- and tetrahalomethylated diphenyl oxides, together with minor proportions of unreacted diphenyl oxide.

Such halomethylated diaryloxides can be prepared by reacting a halomethylating agent as, for example, methylchloromethyl ether, bis(chloromethyl) ether or a mixture of formaldehyde and hydrogen chloride with a diaryloxide such as diphenyl oxide, ditolyl oxide and the like aromatic ethers, in the presence of a catalyst for the reaction such as zinc chloride, aluminum chloride, ferric chloride, borontrifluoride and the like.

Mono- or polyhalomethylated diaryloxides or mixtures thereof are thus prepared depending upon the proportion of halomethylating agent employed, the extent of the halomethylation reaction and on whether steps are taken to separate and purify an individual halomethylated aromatic ether product.

Specific examples of halomethylated diaryloxides that can be separated from the reaction products prepared as just described are mono-(chloromethyl) diphenyl oxide, di-(chloromethyl) diphenyl oxide, tri-(chloromethyl) diphenyl oxide, tetra-(chloromethyl) diphenyl oxide, mono-(bromomethyl) diphenyl oxide, di-(bromomethyl) diphenyl oxide, mono-(chloromethyl) ditolyl oxide, di-(chloromethyl) ditolyl oxide, mono-(bromomethyl) ditolyl oxide, etc.

While individual halomethylated diaryloxides can be employed in the foaming process of the invention, they are relatively less effective as foam formers when thus employed than when employed in mixtures of the mono- and polyhalomethylated diaryloxides. It has been observed that the crude mixtures of the halomethylated diaryloxides obtained by means of the foregoing preparative procedures can be employed in the invention to great advantage. Such mixtures generally contain major proportions of di- and trihalomethylated diaryloxides and lesser proportions of the mono- and tetrahalomethylated diaryloxides as well as some unreacted diaryloxide.

Under suitable reaction conditions, the above-described halomethylated diaryloxides undergo a condensation reaction splitting out a hydrogen halide gas. A foam is then produced by the expanding hydrogen halide entrapped in the forming polymers which comprise a plurality of diaromatic ether nuclei connected by means of methylene bridges.

The foamed polymers obtained in accordance with this process are solid, self-extinguishing foams that have a retained combined halogen content up to about 75 percent of the original combined halogen content.

It should be noted that the halomethylated diaryloxide reactants may be employed together with one or more foam-modifying, non-halomethylated aromatic starting materials. Examples of such materials are diaromatic ethers, benzene, toluene or biphenyl and the like materials. At least a portion of such non-halomethylated reactants usually enters into the condensation reaction and becomes chemically bonded in the foamed product. Similarly, polymeric materials can also be employed as foam modifiers.

The above-described foaming reactions are promoted by the employment of catalysts which are generally of the Lewis acid type, i.e., electron acceptors. Included within the scope of operable catalysts are aluminum chloride, ferric chloride, stannic chloride, zinc chloride, ferric phosphate, borontrifluoride and like catalysts. Also operable are such acid catalysts as hydrogen chloride, sulfuric acid, phosphoric acid, phosphorus pentoxide and the like acidic catalysts. These catalysts are highly effective when employed in very small proportions and even when employed in a form deactivated by contact with water or aqueous solutions of the acid bases or salts. A preferred class of catalysts within this group consists of the ferric and ferrous phosphates which can be uniformly and easily dispersed throughout the monomer composition. Generally effective results are obtained by employing the catalyst material in concentrations from about 0.01 to about 2 weight percent of the condensible halomethylated diaryloxide monomer.

Reaction temperatures can vary within wide limits. The optimum temperature of the reaction will depend to a great extent upon the particular catalyst and the quantities thereof employed. Although higher temperatures are operable, the temperatures usually employed are within the range of from about 40° to about 200° C. and preferably at about 60° C. This, of course, means that in order for the process to be operative, the catalyst containing feed streams must be maintained at temperatures lower than those which are sufficient to initiate the foaming reaction. The foaming reaction is usually carried out at about atmospheric pressure, e.g., at pressures of from about 0.5 to 1.5 atmospheres but it can be accomplished at lower or higher pressures. Higher or lower pressures, of course, produce the expected effect in the density of the resulting foam, i.e., the density is proportional to the ambient pressure conditions.

While the foams of the invention are self-curing, the process is aided by the application of heat. Radiant heat sources such as infrared bulbs are satisfactory for this purpose.

FIGURE I is a schematic diagram of a specific embodiment of the process for carrying out the continuous foaming operation of the invention.

Miscible complementary portions of an in situ foamable composition are provided in feed lines 1 and 3. The portion in feed line 1 is conveyed to a catalyst mixer 10 in which desired quantities of a catalyst are incorporated into the monomer. The catalyst-containing portion emerges in feed line 2. The portion in feed line 3 and the catalyst-containing portion in feed line 2 then pass into a proportionating pump 11 which maintains fixed relative flow rates in each of the feed lines. After emerging from the proportionating pump 11, the uncatalyzed contents of feed line 3 enter a heat exchanger 12. The uncatalyzed stream is heated therein to a temperature sufficient to provide the ultimately required thermal energy for activation of the in situ foamable composition. The catalyzed and heated streams in feed lines 2 and 3, respectively, are then introduced into a mixing head 13 equipped with a stirring device 14. Mixing of the streams is completed therein almost instantaneously due to their miscibility. The resulting mixture contains a homogeneous dispersion of the catalyst and sufficient thermal energy to immediately initiate the foam-forming reaction. The reacting liquid mixture is then fed directly into a foaming container 15 in which, preferably, a liquid inventory 17 is constantly maintained. As the foam 18 continuously forms at the liquid surface, a continuous displacement of the older foam occurs in an upward direction. After a short period of time, e.g., on the order of about 10 to about 30 seconds, a foam is obtained which is capable of retaining a molded shape, e.g., the shape of the foaming container 15 or other mold form. The foam thus obtained may then be cut into desired lengths. An optional embodiment of the above process employs a screen 19 as a foam modifier just above the liquid surface in the foaming container 15.

As previously mentioned, it may be desirable to subject the foam as it is formed to elevated temperatures in order to promote faster curing. This may be accomplished by incorporating heating means into the foaming container or alternatively by applying heat from removed heat sources.

It has been discovered that foams prepared by the process of the invention can be conveniently modified to provide a more homogeneous product, especially with regard to pore size, by causing the foam immediately subsequent to its formation and prior to any substantial curing thereof, to pass through a screen placed just above the surface of the foaming mixture. Such a screen is, of course, optional but it has been discovered that by means of its employment, it is possible to achieve a more homogeneous cell or pore structure in the resulting foam. Suitable materials of construction for these screens are stainless steel, fiberglass, and like acid resistant materials. The screen size employed will depend upon the extent of modification desired but generally mesh sizes from about 2 to about 35 are capable of achieving effective modification of the foams thus produced. The screen to be employed is placed at a distance of about 0.5 to about 2 inches above the fluid surface. Frequently, when preparing foams in this manner, it may be desirable to position longitudinal forms above such screens in the manner so as to divide or otherwise mold or shape the foam thus prepared into desired forms.

The following operations are further illustrations of the present invention but the invention should not be construed as being limited thereto.

A mixture of chloromethylated diphenyloxide containing about 48 percent of the monochloromethyl derivative, 27 percent of the dichloromethyl derivative, 1.6 percent of the trichloromethyl derivative, 0.27 percent of the tetrachloromethyl derivative and a remainder of diphenyl oxide was supplied as a mixture to each of two feed lines. The first feed line ran to a catalyst mixer which incorporated 4.5 weight percent of ferrous phosphate into the chloromethylated diphenyloxide composition. This line and the second line then passed into a proportionating pump (Milton-Roy Duplex) which was set to pump uncatalyzed material at the rate of 70 cubic centimeters per minute and catalyzed material at a rate of 35 cubic centimeters per minute. The second line, after leaving the proportionating pump, entered a heat exchange zone of a heat exchanger which consisted of 5 turns of the line around a 3 inch mandrel with the coil thus constructed being set in a controlled heating bath maintained at 165° C. The heated monomer and the catalyzed monomer feed lines then converged at a turbine-stirred mixing head wherein complete mixing of the miscible complementary portions was achieved. The temperature of the resulting reaction mixture was 135° C. This mixture was ejected from the mixing head into the foaming container which consisted of a tin vessel 5 x 8 x 12 inches connected at its bottom to the mixing head by means of a short tube. The total residence time of the reaction mixture within the mixing head was less than 5 seconds.

During operation, an inventory of approximately 1 inch of the liquid foaming mixture was maintained in the bottom of the foaming container. Foaming occurred at this liquid surface and as the foam was continuously displaced upwardly in the foaming container, several foam boards 5 x 8 inches x 6 feet were prepared. The resulting product was a solid foam having a density of 2.4 pounds per cubic foot.

It should be noted that in view of the extensive quantities of gaseous hydrogen chloride or hydrogen bromide, whichever the case may be, evolved during the foaming reaction, the foaming container should be placed in an area equipped for the control of such gases.

The solid foams prepared in the above run were open cell structures from which residual hydrogen chloride was removed by air blowing.

In operations similar to that of the foregoing, other chloro- and bromomethylated diaryloxides selected from the group consisting of mono-(chloromethyl) diphenyl oxide, tri-(chloromethyl) diphenyl oxide, tetra-(chloromethyl) diphenyl oxide, mono-(bromomethyl) diphenyl oxide, tri-(bromomethyl) diphenyl oxide, tetra-(bromomethyl) diphenyl oxide, mono-(chloromethyl) ditolyl oxide, tri-(chloromethyl) ditolyl oxide, tetra-(chloromethyl) ditolyl oxide, mono-(bromomethyl) ditolyl oxide, mono-(chloromethyl) tolylphenyl oxide, tri-(bromomethyl) tolylphenyl oxide, tetra-(chloromethyl) tolylphenyl oxide, mixtures of the foregoing and mixtures of any of the foregoing with halomethylated diaryloxides of the group consisting of di-(chloromethyl) diphenyl oxide, di-(bromomethyl) diphenyl oxide, di-(chloromethyl) ditolyl oxide, di-(bromomethyl) ditolyl oxide, di-(chloromethyl) tolylphenyl oxide, di-(bromomethyl) tolyphenyl oxide and mixtures thereof are substituted for the mixture of halomethylated diaryloxides employed in the foregoing operations to achieve like results. Likewise, other catalyst materials selected from the group of aluminum chloride, ferric chloride, stannic chloride, zinc chlorine, ferric phosphate, borontrifluoride, hydrogen chloride, sulfuric acid, phosphoric acid, phosphorus pentoxide and mixtures thereof are substituted for the ferrous phosphate in the above-described operation to achieve similar results.

What is claimed is:

1. A continuous foaming process which comprises the steps of providing a plurality of feed streams of miscible complementary portions of liquid, in situ foamable material comprising a major proportion of at least one halomethylated diaryloxide wherein the halogens are selected from the group consisting of chlorine and bromine, at least one of said streams comprising a Lewis acid, foam-initiating catalyst material and being at a temperature below about that at which a foaming reaction occurs and at least one of said streams being substantially free of such a catalyst material and containing sufficient thermal energy to bring a mixture of said plurality of streams to a foaming-reaction temperature from about 40° to about 200° C. and causing said plurality of streams to be mixed with one another whereby a solid foam is produced.

2. A process as in claim 1 wherein at least one of the halomethylated diaryloxides employed is a chloromethylated diphenyl oxide containing from 1 to 4 chloromethyl groups.

3. A process as in claim 1 wherein at least one of the halomethylated diaryloxides employed is a bromomethylated diphenyl oxide containing from 1 to 4 bromomethyl groups.

4. A process as in claim 1 wherein the foam-initiating catalyst material is selected from the group consisting of aluminum chloride, ferric chloride, stannic chloride, zinc chloride, ferric phosphate, ferrous phosphate, borontrifluoride, hydrogen chloride, sulfuric acid, phosphoric acid and phosphorus pentoxide.

5. A process as in claim 1 wherein at least one of the halomethylated diaryloxides is selected from the group consisting of chloromethylated diphenyl oxides containing from 1 to 4 chloromethyl groups and bromomethylated diphenyl oxides containing from 1 to 4 bromomethyl groups and the foam-initiating catalyst material is selected from the group consisting of aluminum chloride, ferric chloride, stannic chloride, zinc chloride, ferric phosphate, ferrous phosphate, borontrifluoride, hydrogen chloride, sulfuric acid, phosphoric acid and phosphorus pentoxide.

6. A continuous foaming process which comprises the steps of providing a plurality of feed streams of miscible complementary portions of liquid, in situ foamable material comprising a major proportion of at least one halomethylated diaryloxide wherein the halogens are selected from the group consisting of chlorine and bromine, at least one of said streams comprising a Lewis acid, foam-initiating catalyst material and being at a tempertaure below about that at which a foaming reaction occurs and at least one of said streams being substantially free of such a catalyst material and containing sufficient thermal energy to bring a mixture of said plurality of streams to a foaming-reaction temperature from about 40° to about 200° C., causing said plurality of streams to be mixed with one another, conveying the resulting reacting mixture into a suitable foaming container in which a liquid inventory of the reacting mixture is constantly maintained and causing the foam evolved from the reacting mixture to pass through a screen located just above the liquid surface of the reacting mixture.

References Cited in the file of this patent
UNITED STATES PATENTS 2,911,380　　Doedens ---------------- Nov. 3, 1959